(No Model.)
W. A. ROBERTS.
CAR BRAKE.
No. 251,290. Patented Dec. 20, 1881.
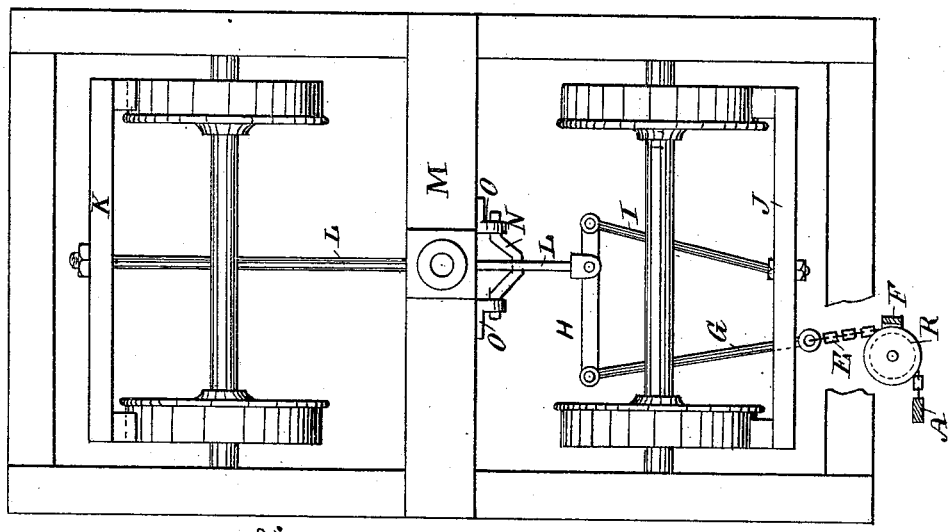
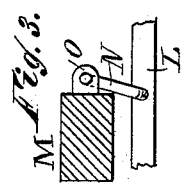
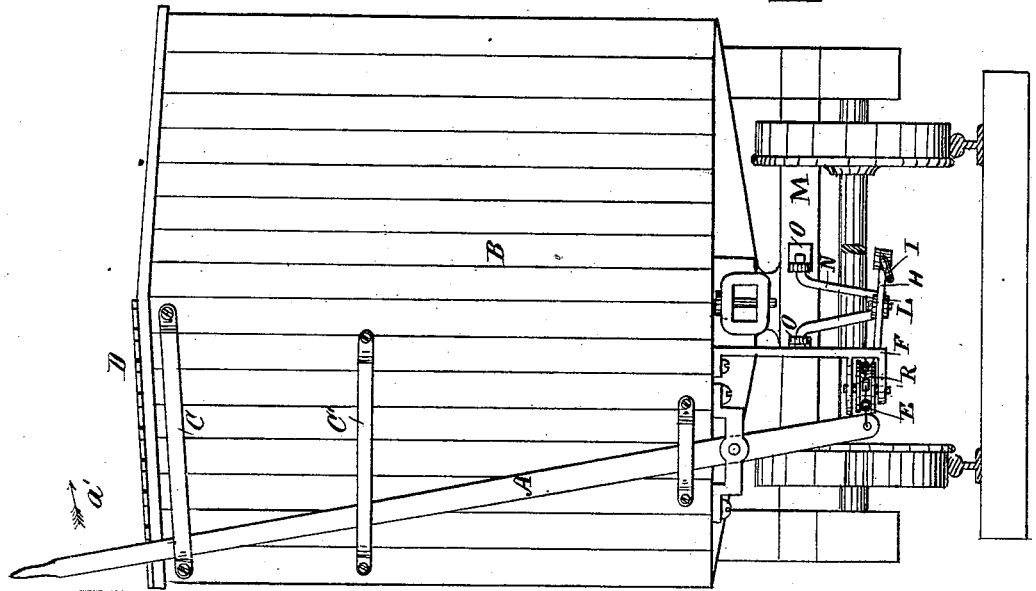
WITNESSES:
Theo. G. Hosten
C. Sedgwick
INVENTOR:
W. A. Roberts
BY Munn & Co
ATTORNEYS.

UNITED STATES PATENT OFFICE.

WILLIAM A. ROBERTS, OF BATTLE CREEK, MICHIGAN.

CAR-BRAKE.

SPECIFICATION forming part of Letters Patent No. 251,290, dated December 20, 1881.

Application filed November 3, 1881. (No model.)

*To all whom it may concern:*

Be it known that I, WILLIAM AUGUSTUS ROBERTS, of Battle Creek, in the county of Calhoun and State of Michigan, have invented a new and Improved Car-Brake, of which the following is a full, clear, and exact description.

The object of my invention is to provide a new and improved car-brake which can be operated rapidly, easily, and with safety.

The invention consists in a lever pivoted to the bottom of the end of the car, and having its lower end connected with the brake draw-rods by a chain passing over a pulley pivoted in a bracket-arm on the bottom of the car, so that when this lever is thrown the chain will be drawn outward and draw the brake up tight.

The invention further consists in suspending the draw-rod connecting the front and rear brake-bars from the cross-beam of the truck by a loop pivoted to the side of this cross-beam, whereby undue swinging of the brake-bars is avoided.

Reference is to be had to the accompanying drawings, forming part of this specification, in which similar letters of reference indicate corresponding parts in all the figures.

Figure 1 is an elevation of a car provided with my improved brake, part of the forward axle being broken off to show the construction. Fig. 2 is a plan view of one of the trucks provided with my improved brake. Fig. 3 is a cross-sectional elevation of the central cross-beam of the truck.

A lever, A, reaching to the roof of the car B, is pivoted to the bottom of this car, and is guided by guide-bars or longitudinal guide-loops C C', attached to the end of the car, and rests against a rack or equivalent, D, attached to the end of the roof of the car. A chain, E, is fastened to the lower end of this lever A, and passes partially around a grooved pulley, R, journaled in a bracket-frame, F, attached to the bottom or end of the car. As stated, one end of the chain E is attached to the lever A, and the other end is attached to a rod, G, pivoted to the end of a lever, H, pivoted at its opposite end to a rod, I, attached to the front brake-shoe bar, J. One end of a draw-rod, L, is pivoted to the lever H, a short distance from that end of the lever H pivoted to the rod I, and the opposite end of the rod L is attached to the rear brake-shoe bar, K. The draw-rod L is suspended from the cross-beam M of the truck by a loop, N, passing through the draw-rod and pivoted in lugs O, projecting from the front side surface of this beam M. In passenger-cars the lever A would only have to extend up to the top of the iron frame or fence at the end of the platform.

This brake can be used for any kind of cars, and, if desired, the lever A can be arranged on the side of the car.

The operation is as follows: If the brakes are to be applied, the upper end of the lever A is drawn in the direction of the arrow a', whereby the chain E and the rod H will be drawn toward the front of the truck and the brake-shoe J pressed against the front wheels. At the same time the draw-rod L is drawn toward the front end of the truck, and the brake-shoe bar K will be pressed against the rear wheels. By this movement of the draw-rod L the lower end of the loop N will be swung forward and upward. The several parts are locked in the above positions by passing the lever A into one of the notches of the rack D. If the bar L is released, the several parts will resume their former positions, the loop N swinging downward and backward. As the loop N rests against the edge of the cross-beam M when hanging down, as shown in Fig. 3, it prevents the brake-bars J and K from moving too far from the wheels, and thus avoids undue vibration of the brake-bars.

The above-described brake can be applied more rapidly and easily than the brakes in use heretofore, and it does not in any way endanger the life of the operator.

Having thus fully described my invention, I claim as new and desire to secure by Letters Patent—

1. In a car-brake, the combination, with the cross-beam M, brake-bars J K, the lever H, and the rod I, of the draw-bar L, connected at its ends to the brake-bar K and the lever H, and the loop N, passed through the draw-bar and pivoted to the said cross-beam, substantially as shown and described, whereby undue vibration of the brake-bars is avoided, as set forth.

2. In a car-brake, the combination, with the lever A, the chain E, the rod G, the lever H, the rod I, the brake-bars J K, and the cross-beam M, of the draw-rod L and the loop N, passed through the draw-bar and pivoted to the said cross-beam, substantially as and for the purpose set forth.

WILLIAM AUGUSTUS ROBERTS.

Witnesses:
 MYRON H. JOY,
 SAMUEL W. JOY.